United States Patent
Tabuchi

(10) Patent No.: US 8,001,368 B2
(45) Date of Patent: Aug. 16, 2011

(54) HOT-PLUGGABLE INFORMATION PROCESSING DEVICE AND SETTING METHOD

(75) Inventor: Yoji Tabuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 769 days.

(21) Appl. No.: 12/073,307

(22) Filed: Mar. 4, 2008

(65) Prior Publication Data

US 2008/0222406 A1    Sep. 11, 2008

(30) Foreign Application Priority Data

Mar. 6, 2007  (JP) ................................. 2007-055427

(51) Int. Cl.
G06F 9/00    (2006.01)
G06F 1/00    (2006.01)
G06F 3/00    (2006.01)
G06F 13/14   (2006.01)
G06F 9/455   (2006.01)
H05K 7/10    (2006.01)

(52) U.S. Cl. ................. 713/1; 713/2; 713/100; 713/300; 710/10; 710/302; 710/305; 718/1

(58) Field of Classification Search .................. 713/1, 2, 713/100, 300; 710/10, 302, 305; 718/1
See application file for complete search history.

(56) References Cited

U.S. PATENT DOCUMENTS

| 6,496,893 | B1 * | 12/2002 | Arai ................................ 710/302 |
| 6,976,145 | B1 * | 12/2005 | Bradford ........................ 711/170 |
| 7,017,034 | B2 | 3/2006 | Qureshi et al. |
| 7,234,050 | B2 * | 6/2007 | Agan et al. ......................... 713/1 |
| 7,558,724 | B2 * | 7/2009 | Rostampour et al. ............ 703/27 |
| 7,757,030 | B2 * | 7/2010 | Sherwin et al. ................ 710/302 |
| 2004/0255109 | A1 | 12/2004 | Nakajima |
| 2006/0248526 | A1 | 11/2006 | Rostampour |

FOREIGN PATENT DOCUMENTS

| JP | 2004-070952 A | 3/2004 |
| JP | 2004-362006 A | 12/2004 |
| JP | 2006-309754 A | 11/2006 |

* cited by examiner

*Primary Examiner* — Stefan Stoynov

(74) *Attorney, Agent, or Firm* — Foley & Lardner LLP

(57) ABSTRACT

A generator generates configuration information of a virtual hardware unit based on configuration information in a PCI-BOX. The generator generates recognition information for recognizing the virtual PCIBOX as a PCIBOX that is connected with a slot from the configuration information of the virtual PCIBOX. When PCIBOX is connected with the slot, the generator overwrites the configuration information in PCIBOX with the configuration information of the virtual PCIBOX.

4 Claims, 3 Drawing Sheets

HOT-PLUGGABLE INFORMATION PROCESSING DEVICE AND SETTING METHOD

This application is based upon and claims the benefit of priority from Japanese patent application No. 2007-055427, filed on Mar. 6, 2007, the disclosure of which is incorporated herein in its entirety by reference

BACKGROUND OF THE INVENTION

1. Field of the Invention

The present invention relates to an information processing device and a setting method.

2. Description of the Related Art

Computer systems have been more and more desired to be hot-pluggable. Hot Plug is a function of a computer system to recognize a hardware unit that is connected to the computer system while the computer system is running and make the hardware unit incorporated in the computer system. The hardware unit may be PCIBOX, for example.

For a computer system to recognize a hardware unit, the OS of the computer system is required to recognize the configuration of the hardware. The ACPI (Advanced Configuration and Power Interface) specification may be used for recognizing the configuration of the hardware unit. The ACPI specification defines management of power supplied from a computer system to a hardware unit. Under the ACPI specification, hardware configuration is recognized for the purpose of managing the supply of power to each hardware unit.

In the hardware unit recognition under the ACPI specification, BIOS first creates an ACPI table and an AML (ACPI Machine Language) based on configuration information in a configuration space of the hardware unit. The ACPI table and the AML are information for recognizing a hardware unit under the ACPI specification. The ACPI table shows information on hardware configuration. The AML is a program to cause a CPU to input and output information to and from the hardware unit. Hereinafter, the ACPI table and the AML will be collectively called the ACPI information.

When the CPU boots up the OS, the CPU loads the ACPI information into the OS to make the OS recognize the hardware unit.

Such a technique is described in Patent Document 1 (Japanese Unexamined Patent Application Publication No. 2004-70952), for example.

In the hardware recognition under the ACPI specification, the computer system performs the processing shown below to realize Hot Plug.

First, when a hardware unit is connected to a running computer system, BIOS obtains the configuration information in the configuration space of the connected hardware unit and updates the ACPI information according to the configuration information. Then, the OS changes its hardware recognition according to the updated ACPI information.

However, the recognition under the ACPI specification has a problem in that a computer system cannot realize Hot Plug unless its OS supports Hot Plug. If an OS does not support Hot Plug, it cannot change its hardware recognition even after the ACPI information is updated.

SUMMARY OF THE INVENTION

An object of the present invention is to provide an information processing device and a setting method for the same for solving the abovementioned problem because a computer system cannot realize Hot Plug unless its OS supports Hot Plug.

In order to achieve the object of the invention, the information processing device according to the present invention is an information processing device that includes a plurality of slots each of which can be connected with a hardware unit that stores configuration information thereof; an OS store that stores an OS; a BIOS store that stores BIOS; and a CPU that runs said BIOS to realize a generator that generates recognition information for recognizing said hardware unit from the configuration information in the hardware unit if the hardware unit is connected with said slot when the information processing device is booting up and runs said OS to realize a controller that recognizes said connected hardware unit by using the recognition information generated by said generator, wherein each of said plurality of slots can be connected with a hardware unit of the same specification, with at least one of said plurality of slots being connected with said hardware unit, and if a slot is not connected with said hardware unit when the information processing device is booting up, said generator generates the configuration information of a virtual hardware unit based on the configuration information in said connected hardware unit, generates the recognition information for recognizing the virtual hardware unit as a hardware unit connected with the slot from the configuration information of the virtual hardware unit, and when said hardware unit is connected with the slot, overwrites the configuration information in the connected hardware unit with the configuration information of the virtual hardware unit.

The setting method according to the present invention is a setting method performed by an information processing device that includes a plurality of slots each of which can be connected with a hardware unit that stores configuration information thereof, with at least one of said plurality of slots being connected with said hardware unit; an OS store that stores an OS; a BIOS store that stores BIOS; and a CPU that runs said BIOS to realize a generator that generates recognition information for recognizing said hardware unit from the configuration information in the hardware unit if the hardware unit is connected with said slot when the information processing device is booting up and runs said OS to realize a controller that recognizes said connected hardware unit by using the recognition information generated by said generator comprises generating the configuration information of a virtual hardware unit based on the configuration information in said connected hardware unit for a slot if there is a slot which is not connected with said hardware unit when the information processing device is booting up; generating the recognition information of the virtual hardware unit as a hardware unit connected with the slot from the configuration information of the virtual hardware unit, and an updating step of overwriting the configuration information in the connected hardware unit with the configuration information of the virtual hardware unit when said hardware unit is connected with the slot.

The above and other objects, features, and advantages of the present invention will become apparent from the following description with reference to the accompanying drawings which illustrate examples of the present invention

DETAILED DESCRIPTION OF THE PREFERRED EMBODIMENTS

An exemplary embodiment of the present invention will be described with reference to the drawings.

Figure 1:
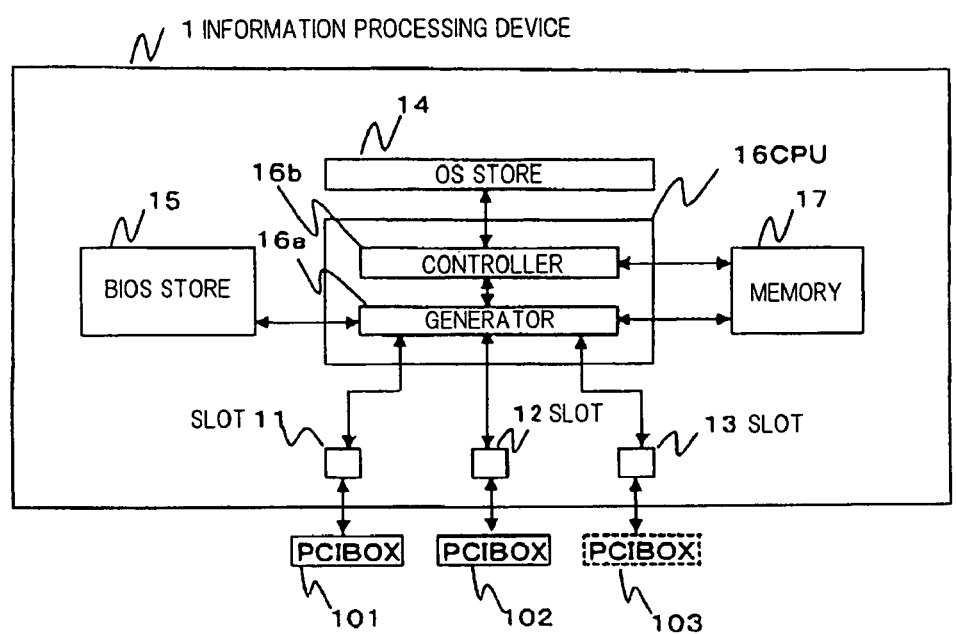
FIG. 1 is a block diagram showing the configuration of an information processing device of a first exemplary embodiment of the present invention.

FIG. 1 is a block diagram showing the configuration of an information processing device of a first exemplary embodiment of the present invention.

In FIG. 1, information processing device 1 includes slots 11 to 13, OS store 14, BIOS store 15, CPU 16 and memory 17. Although only three slots are described in the exemplary embodiment, any number more than one of the slots may be used in actual cases.

Each of slots 11 to 13 is interfaces that can be connected with PCIBOX.

PCIBOXes that can be connected with slots 11 to 13 are in the same specification and defined in correspondence with information processing device 1.

At least one of slots 11 to 13 is connected with PCIBOX when information processing device 1 boots up. In the exemplary embodiment, PCIBOX 101 is connected with slot 11 and PCIBOX 102 is connected with slot 12 when information processing device 1 boots up. PCIBOX 103 is not connected when information processing device 1 boots up. PCIBOX 103 is connected when information processing device 1 boots up, but PCIBOX 103 is connected while information processing device 1 is running.

Each of PCIBOXes 101 to 103 is a hardware unit to connect information processing device 1 with a PCI card, including a slot for a PCI card that can be connected with one or more PCI cards. A PCI card may or may not be connected with PCIBOX.

Information processing device 1 and PCIBOXes 101 to 103 comprise a computer system. PCIBOX comprises an IO node which includes IOH (Input Output Hub) and Bridge in a chipset of the computer system.

Each of PCIBOXes 101 to 103 includes a configuration space. The configuration space is a register for storing configuration information of the PCIBOX itself. The configuration information is information on the configuration (such as feature, type and operation) of PCIBOX, including a static set value and a dynamic set value. The static set value is information for identifying the specification of PCIBOX. All the PCIBOX of the same specification have the same static set value. The dynamic set value is resources (base address) of memory 17 which are to be allocated to PCIBOX, for example. The dynamic set value is set at information processing device 1.

OS store 14 stores an OS. The OS supports Hot Plug of the PCI card, though not supporting Hot Plug of PCIBOX.

BIOS store 15 stores BIOS. The BIOS is firmware (FW) for controlling boot-up and operation of information processing device 1.

The OS and the BIOS comply with the ACPI specification.

When CPU 16 boots up, CPU 16 reads BIOS in BIOS store 15 and runs the read BIOS to realize generator 16a. Generator 16a may load BIOS in BIOS store 15 into memory 17 and read BIOS in memory 17.

Generator 16a performs the POST (Power on Self Test) which is for checking whether a computer system has failed or not. While the POST is performed, generator 16a initializes a chipset in the computer system. The chipset include a chipset in the PCIBOX.

Here, generator 16a accesses a configuration space of each of PCIBOXes 101 and 102 which are connected with slots 11 and 12. Generator 16a initializes a dynamic set value including configuration information in the configuration space of each of PCIBOXes 101 and 102. Then, generator 16a sets the resources of memory 17, which is to be allocated to each of PCIBOXes 101 and 102, in a dynamic set value including configuration information in the configuration space of each of PCIBOXes 101 and 102.

Generator 16a generates a pseudo configuration space for each slot to which the PCIBOX is not connected. In the exemplary embodiment, as the slot to which the PCIBOX is not connected is only slot 13, generator 16a generates a pseudo configuration space for slot 13.

The pseudo configuration space is storage region for storing configuration information of a virtual hardware unit (PCIBOX).

If BIOS is loaded into memory 17, generator 16a generates the pseudo configuration space in a region which is occupied by BIOS in memory 17. If BIOS is not loaded into memory 17, generator 16a may generate the pseudo configuration space in BIOS store 15 or in the region for firmware in memory 17.

Hereinafter, it is assumed that generator 16a loads BIOS into memory 17 and generates a pseudo configuration space in the region which is occupied by BIOS in memory 17.

Generator 16a generates configuration information of a virtual PCIBOX based on configuration information in the configuration space of either PCIBOX 101 or PCIBOX 102. Hereinafter, the configuration space of PCIBOX 101 or 102 is called an actual configuration space, and configuration information of a virtual PCIBOX is called pseudo configuration information.

The pseudo configuration information is specifically generated as in the manner shown below.

First, generator 16a obtains a static set value of the configuration information in the actual configuration space and stores the static set value in the pseudo configuration space.

Then, generator 16a sets a dynamic set value in the pseudo configuration space so that the resources of memory 17 are also allocated to the virtual PCIBOX. As a result, pseudo configuration information is generated in the pseudo configuration space.

When generator 16a generates the configuration information of the virtual PCIBOX, generator 16a generates recognition information for recognizing PCIBOX 101 and recognition information for recognizing PCIBOX 102 from the configuration information in the configuration space of each of the connected PCIBOXes 101 and 102.

The recognition information includes an ACPI table and the AML. The ACPI table shows the configuration information. The AML is a program for causing the CPU (OS) to input and output information to and from the hardware unit which is indicated by the configuration information shown in the ACPI table.

Hereinafter, the recognition information is called ACPI information.

Generator 16a generates the ACPI information for recognizing a virtual PCIBOX as a PCIBOX which is connected with slot 13 from the pseudo configuration information in the pseudo configuration space.

Accordingly, generator 16a is to generate pieces of the recognition information by the number of PCIBOXes that can be connected with information processing device 1 (which is the same as the number of slots "3"). Hereinafter, the number of PCIBOXes that can be connected with information processing device 1 is called the maximum number.

When generator 16a generates the maximum number of pieces of the ACPI information, CPU 16 runs the OS in OS store 14 to realize controller 16b that recognizes PCIBOXes 101 and 102 and a virtual PCIBOX by using the maximum number of the pieces of ACPI information.

Specifically, CPU 16 loads the OS in OS store 14 into memory 17, and then loads the maximum number of the pieces of ACPI information into the OS in memory 17. CPU 16 reads the OS (including the ACPI information) in memory 17 and runs the OS to realize controller 16b.

As a result, controller 16b recognizes PCIBOXes 101 and 102 and also recognizes the virtual PCIBOX as the PCIBOX connected with slot 13.

If it is required to refer to the configuration information of the recognized PCIBOX, controller 16b generates a reference request to refer to the configuration information. The reference request includes information for specifying a PCIBOX that comprises the configuration information that is required to be referred to. Controller 16b generates the reference request as a call of a predetermined routine which is provided by generator 16a to controller 16b.

When a PCIBOX that is specified by the reference request generated at controller 16b is connected to information processing device 1, generator 16a operates (reads or writes) the configuration information in the configuration space of the PCIBOX and informs controller 16b of the read/write configuration information. The operation performed by generator 16a on the configuration information in the configuration space is generally called the PCI configuration cycle.

When PCIBOX that is specified by the reference request generated at controller 16b is virtual PCIBOX, generator 16a informs controller 16b of pseudo configuration information in pseudo configuration space of the virtual PCIBOX as the configuration information of PCIBOX that is specified by the reference request.

When PCIBOX 103 is connected with slot 13 while information processing device 1 is running, generator 16a overwrites the configuration information in the configuration space of PCIBOX 103 with the pseudo configuration information in the pseudo configuration space.

Next, the operation will be described.

Figure 2:
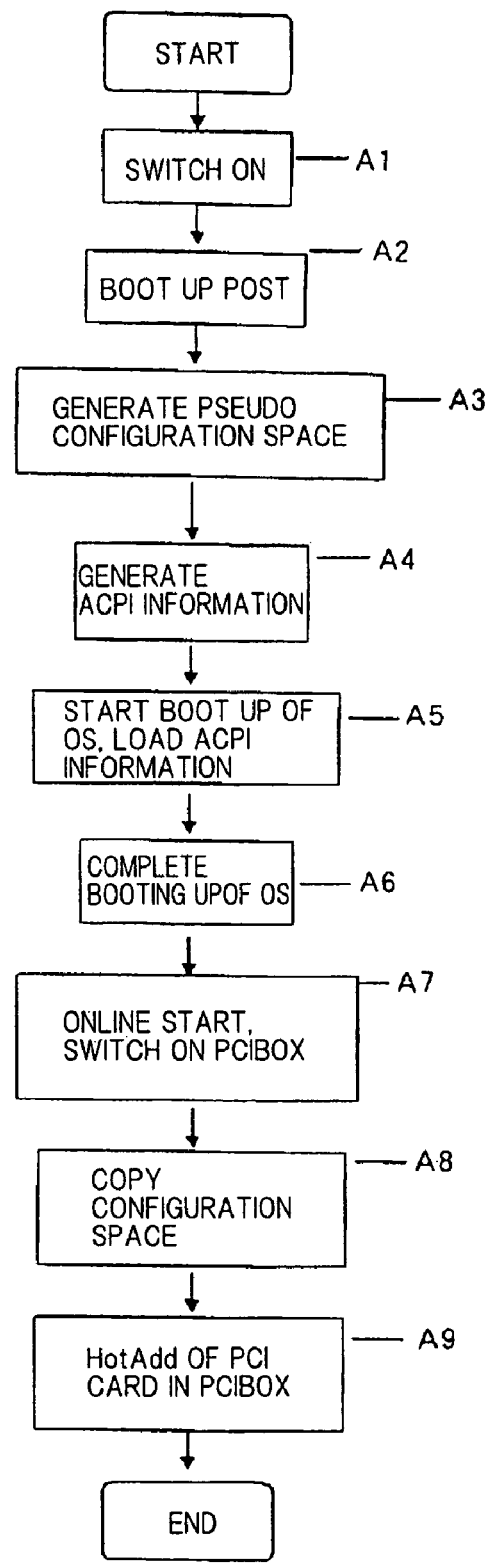
FIG. 2 is a flowchart showing exemplary operation of the information processing device.

FIG. 2 is a flowchart for describing an exemplary operation of the information processing device 1.

At step A1, Electricity is supplied in information processing device 1. Electricity is supplied in CPU 16 and PCIBOXes 101 and 102.

When Electricity is supplied in CPU 16, CPU 16 performs step A2.

At step A2, CPU 16 loads BIOS in BIOS store 15 into memory 17, reads the BIOS in memory 17 and runs the read BIOS to realize generator 16a. Then, generator 16a performs the POST. After performing the POST, generator 16a performs step A3.

At step A3, generator 16a accesses the configuration space of each of the connected PCIBOXes 101 and 102. Generator 16a initializes the dynamic set value of the configuration information in the configuration space, and then sets the resources of memory 17, which are to be allocated to each of PCIBOXes 101 and 102, in a dynamic set value including configuration information in the configuration space of each of PCIBOXes 101 and 102.

Generator 16a generates a pseudo configuration space for slot 13, to which PCIBOX is not connected, in the region which is occupied by BIOS in memory 17.

Then, generator 16a accesses the configuration space of either PCIBOX 102 or 102, obtains a static set value of the configuration information in the configuration space, and stores the static set value in the pseudo configuration space. Generator 16a sets a dynamic set value in the pseudo configuration space so that resources of memory 17 are also allocated to the virtual PCIBOX, and generates pseudo configuration information in the pseudo configuration space.

After performing step A3, generator 16a performs step A4.

At step A4, generator 16a obtains the configuration information in the configuration space of each of PCIBOXes 101 and 102 and generates the ACPI information of each of PCIBOXes 101 and 102 from the configuration information.

Generator 16a generates the ACPI information for recognizing the virtual PCIBOX as the PCIBOX which is connected with slot 13 from the pseudo configuration information in the pseudo configuration space.

When generator 16a generates the ACPI information, CPU 16 performs step A5.

At step A5, CPU 16 loads the OS in OS store 14 into memory 17, then loads the generated three pieces of ACPI information into the OS in memory 17, and starts boot-up of the OS.

After performing step A5, CPU 16 performs step A6.

At step A6, CPU 16 finishes boot-up of the OS and realizes controller 16b that recognizes PCIBOXes 101 and 102 and the virtual PCIBOX.

When controller 16b needs to obtain the configuration information of the recognized PCIBOX, it generates a reference request and outputs it to generator 16a. When generator 16a accepts the reference request, it determines whether the PCIBOX specified by the reference request is connected or not.

If the PCIBOX is connected, generator 16a performs a PCI configuration cycle on the configuration space in the PCIBOX and operates the configuration information in the configuration space. Then, generator 16a obtains the configuration information that has been read/written and informs controller 16b of the configuration information.

If the PCIBOX is not connected, generator 16a obtains the pseudo configuration information in the pseudo configuration space in memory 17 and informs controller 16b of the pseudo configuration information.

Controller 16b accepts the configuration information. That enables the configuration information to be referenced.

When PCIBOX is connected with slot 13, step A7 is performed.

At step A7, online processing on PCIBOX 103 is started and electricity is supplied in PCIBOX 103. Then, step A8 is performed.

At step A8, generator 16a obtains the pseudo configuration information in the pseudo configuration space from memory 17 and overwrites the configuration space of PCIBOX 103 with the pseudo configuration information.

When a PCI card is connected with a slot for the PCI card of PCIBOX 103, step A9 is performed.

At step A9, controller 16b recognizes the connected PCI card based on the Hot Plug of the PCI card that is supported by the OS.

Now, an advantage will be described.

According to the exemplary embodiment, generator 16a generates configuration information of a virtual hardware unit based on the configuration information in PCIBOXes 101 or 102. Generator 16a generates recognition information for recognizing the virtual PCIBOX as PCIBOX that is connected with slot 13 from the configuration information of the virtual PCIBOX. Next, when PCIBOX 103 is connected with slot 13, generator 16*a* overwrites the configuration information in PCIBOX 103 with the configuration information of the virtual PCIBOX (pseudo configuration information).

In this case, recognition information generated from the configuration information in PCIBOX, after the overwriting, becomes the same as the recognition information for recognizing the virtual PCIBOX as PCIBOX that is connected with slot 13. That eliminates a requirement to update the recognition information even if the PCIBOX is connected while the information processing device is running. Accordingly, the computer system with the OS not supporting Hot Plug can perform Hot Plug.

In the exemplary embodiment, when PCIBOX that is specified by the reference request generated by controller 16*b* is connected, generator 16*a* informs controller 16*b* of the configuration information in the PCIBOX. When the PCIBOX that is specified by the reference request is not connected, generator 16*a* informs controller 16*b* of the pseudo configuration information as the configuration information of the specified PCIBOX.

In this case, even if that PCIBOX is not connected, the configuration information of PCIBOX can be notified the OS.

Now, a second exemplary embodiment will be described. Configuration and operation which differ from those of the first exemplary embodiment will be mainly described below.

In the exemplary embodiment, information processing device 1 performs offline processing (Hot Remove) for releasing the connection (installation) of PCIBOX while it is running. A case where PCIBOXes 101 to 103 are connected with information processing device 1 and the connection of PCIBOX 103 is released while information processing device 1 is running will be described below.

First, different points in the processing performed by generator 16*a* during the boot-up will be described.

During the boot-up, generator 16*a* generates pseudo configuration spaces not only for respective slots to which PCIBOXes are not connected but also for respective slots to which PCIBOXes are connected. During the boot-up, however, generator 16*a* does not store pseudo configuration information in pseudo configuration spaces for respective slots to which the PCIBOX is connected.

Now, the offline processing will be described.

When controller 16*b* is requested to release the connection of PCIBOX 103 by user's operation of the information processing device or the like, it generates a release request to release the connection of PCIBOX 103. The release request includes information for specifying PCIBOX 103 that is requested to be released.

Generator 16*a* obtains the configuration information in the configuration space of PCIBOX 103 that is specified by the release request generated by controller 16*b* as pseudo configuration information. Generator 16*a* stores the pseudo configuration information in a pseudo configuration space for slot 13 that is connected with PCIBOX 103. Then, generator 16*a* switches off PCIBOX 103 and releases the connection of PCIBOX 103.

When the reference request generated at controller 16*b*, generator 16*a* must inform controller 16*b* of the pseudo configuration information in the pseudo configuration space.

Now, the operation will be described.

Figure 3:
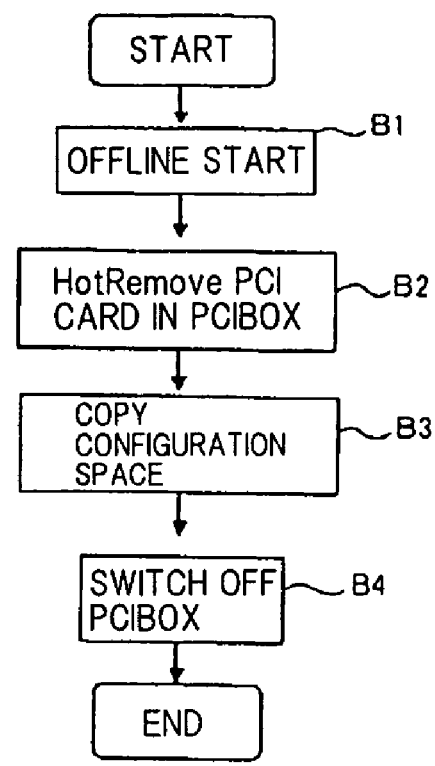
FIG. 3 is a flowchart showing another exemplary operation of the information processing device.

FIG. 3 is a flowchart for describing exemplary offline processing of information processing device 1.

At step B1, controller 16*b* is requested to release the connection of PCIBOX 103 by user's operation of the information processing device or the like. After performing step B1, controller 16*b* performs step B2.

At step B2, controller 16*b* performs Hot Remove on the PCI card that is connected with PCIBOX 103 according to the Hot Plug that is supported by the OS. After performing step B2, controller 16*b* performs step B3.

After performing step B1, if a PCI card is not connected with PCIBOX 103, controller 16*b* skips step B2 and performs step B3.

At step B3, controller 16*b* generates a release request to release the connection of PCIBOX 103 and outputs the release request to generator 16*a*.

When generator 16*a* accepts the release request, it accesses the configuration space of PCIBOX 103. Generator 16*a* obtains the configuration information of the configuration space and stores the configuration information in a pseudo configuration space for slot 13 to which PCIBOX 103 is connected. After performing step B3, generator 16*a* performs step B4.

At step B4, generator 16*a* switches off PCIBOX 103 and releases the connection of PCIBOX 103.

Now, an advantage will be described.

According to the exemplary embodiment, generator 16*a* obtains the configuration information in the PCIBOX that is specified by the release request generated at controller 16*b* as pseudo configuration information and releases the connection of the hardware unit.

In this case, recognition information generated from the configuration information of a pseudo PCIBOX after the connection of PCIBOX is released becomes the same as recognition information generated from the configuration information in PCIBOX before the connection of the PCIBOX is released. That eliminates a requirement to update the recognition information, even if the connection of the PCIBOX is released while the information processing device is running. Accordingly, the computer system with the OS not supporting the Hot Plug can perform Hot Plug.

Connecting the PCIBOX (steps A7 to A9 shown in FIG. 2) and releasing of the connection of the PCIBOX (steps B1 to B4 shown in FIG. 3) enables PCIBOXes to be replaced with other PCIBOXes while the information processing device is running. That enables the computer system to maintain the PCIBOXes even if the PCIBOX hs failed while the information processing device is running.

In the exemplary embodiment, the computer system with the OS not supporting Hot Plug can perform Hot Plug.

In the exemplary embodiment, the controller generates a reference request to refer to the configuration information of the hardware unit. When the hardware unit that is requested by the reference request is connected, the generator preferably informs the controller of the configuration information in the hardware unit. When the hardware unit that is requested by the reference request is not connected, the generator preferably informs the controller of the configuration information of the virtual hardware unit is recognized as the configuration information of the requested hardware unit.

Accordingly, when a hardware unit whose configuration information is requested to be referred to is not connected, the controller is informed that the configuration information of a virtual hardware unit is recognized as configuration information of the requested hardware unit.

That enables the generator to be informed of the configuration information of a hardware unit whose configuration information is requested to be referred to even if the hardware unit is not connected.

Preferably, the controller generates a release request to release the connection of a hardware unit that is connected with the slot, and the generator obtains the configuration information in the hardware unit that is requested by the release request as the configuration information of the virtual hardware unit and then releases the connection of the hardware unit.

That enables the configuration information in a hardware unit that is requested by a release request to be obtained as the configuration information of a virtual hardware unit.

Accordingly, recognition information generated from the configuration information of a virtual hardware unit after the connection of the hardware unit is released becomes the same as recognition information generated from configuration information in the hardware unit before the connection of the hardware unit is released. That eliminates a requirement to update the recognition information, even if the connection of PCIBOX is released while the information processing device is running. Accordingly, the computer system with the OS not supporting Hot Plug can release the connection of the hardware unit while running.

While preferred embodiments of the present invention have been described using specific terms, such description is for illustrative purposes only, and it is to be understood that changes and variations may be made without departing from the spirit or scope of the following claims.

What is claimed is:

1. An information processing device comprising a plurality of slots each of which can be connected with a hardware unit that stores configuration information thereof; an OS store that stores an OS; a BIOS store that stores BIOS; and a CPU that runs said BIOS to realize a generator that generates recognition information for recognizing said hardware unit from the configuration information in the hardware unit if the hardware unit is connected with said slot when the information processing device is booting up and which runs said OS to realize a controller that recognizes said connected hardware unit by using the recognition information generated by said generator, wherein each of said plurality of slots can be connected with a hardware unit of the same specification, with at least one of said plurality of slots being connected with said hardware unit, and if a slot is not connected with said hardware unit when the information processing device is booting up, said generator generates the configuration information of a virtual hardware unit based on the configuration information in said connected hardware unit, generates the recognition information for recognizing the virtual hardware unit as a hardware unit connected with the slot from the configuration information of the virtual hardware unit, and when said hardware unit is connected with the slot, overwrites the configuration information in the connected hardware unit with the configuration information of the virtual hardware unit, wherein said controller generates a reference request to refer to the configuration information of said hardware unit; and when the hardware unit that is specified by said reference request is connected therewith, said generator informs said controller of the configuration information in the hardware unit, and when the hardware unit that is specified by said reference request is not connected therewith, informs said controller of the configuration information of said virtual hardware unit is recognized as the configuration information of the hardware unit that is specified by said reference request.

2. The information processing device according to claim 1, wherein said controller generates a release request to release the connection of the hardware unit that is connected with said slot, and said generator obtains the configuration information in the hardware unit that is specified by said release request as the configuration information of said virtual hardware and then releases the connection of the hardware unit.

3. A setting method performed by an information processing device comprising a plurality of slots each of which can be connected with a hardware unit that stores configuration information thereof, with at least one of said plurality of slots being connected with said hardware unit; an OS store that stores an OS; a BIOS store that stores BIOS; and a CPU that runs said BIOS to realize a generator that generates recognition information for recognizing said hardware unit from the configuration information in the hardware unit if the hardware unit is connected with said slot when the information processing device is booting up and runs said OS to realize a controller that recognizes said connected hardware unit by using the recognition information generated by said generator, comprising:

generating the configuration information of a virtual hardware unit based on the configuration information in said connected hardware unit for a slot if there is a slot which is not connected with said hardware unit when the information processing device is booting up;

generating the recognition information of the virtual hardware unit as a hardware unit connected with the slot from the configuration information of the virtual hardware unit, and overwriting the configuration information in the connected hardware unit with the configuration information of the virtual hardware unit when said hardware unit is connected with the slot, wherein said controller generates a reference request to refer to the configuration information of said hardware unit; and said setting method comprises:

when the hardware unit that is specified by said reference request is connected, informing said controller of the configuration information in the hardware unit, and when the hardware unit that is specified by said reference request is not connected, informing said controller of the configuration information of said virtual hardware unit is recognized as the configuration information of the hardware unit that is specified by said reference request.

4. The setting method according to claim 3, wherein said controller generates a release request to release the connection of the hardware unit that is connected with said slot, and said setting method comprises:

obtaining the configuration information in the hardware unit that is specified by said release request as the configuration information of said virtual hardware, and releasing the connection of said hardware unit.

* * * * *